July 28, 1959
C. R. CANALIZO
2,896,903
CUT-OFF DEVICE
Filed March 5, 1957
2 Sheets-Sheet 1
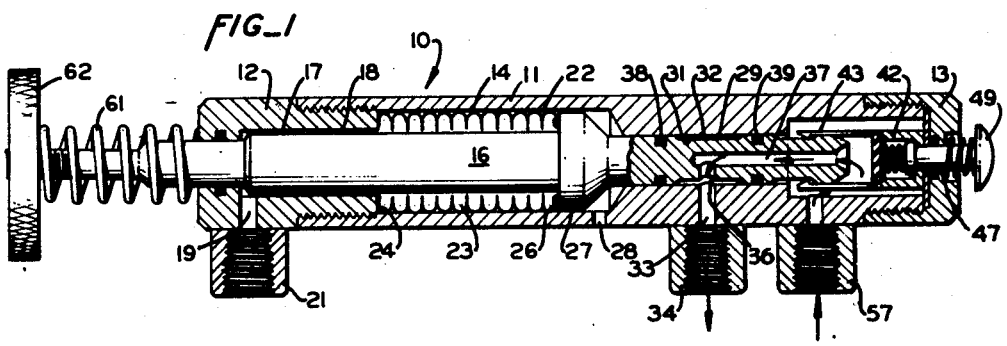
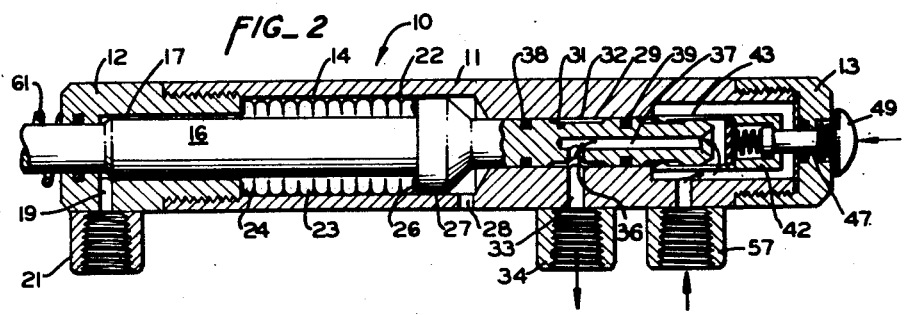
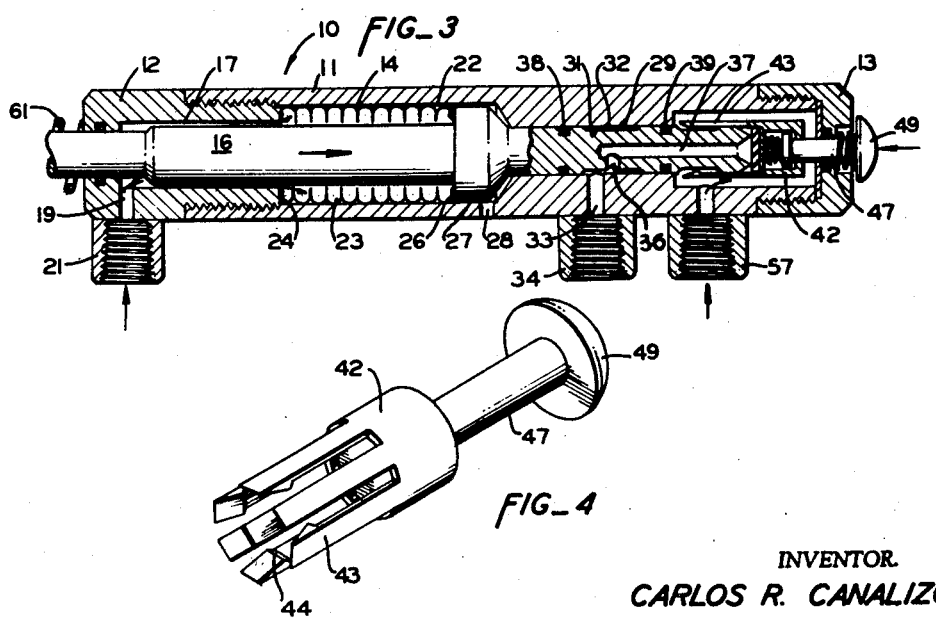
INVENTOR.
CARLOS R. CANALIZO
BY
Mellin and Hanson
ATTORNEYS July 28, 1959
C. R. CANALIZO
2,896,903
CUT-OFF DEVICE
Filed March 5, 1957
2 Sheets-Sheet 2
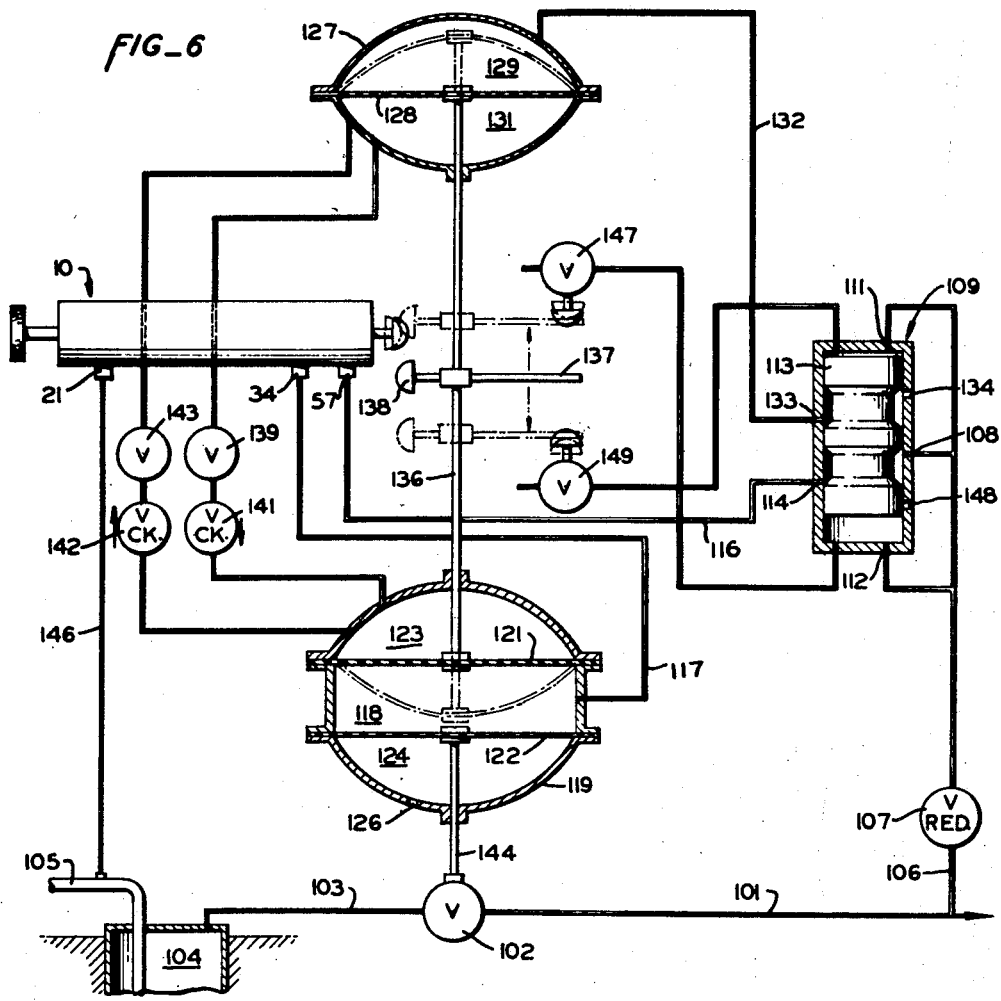
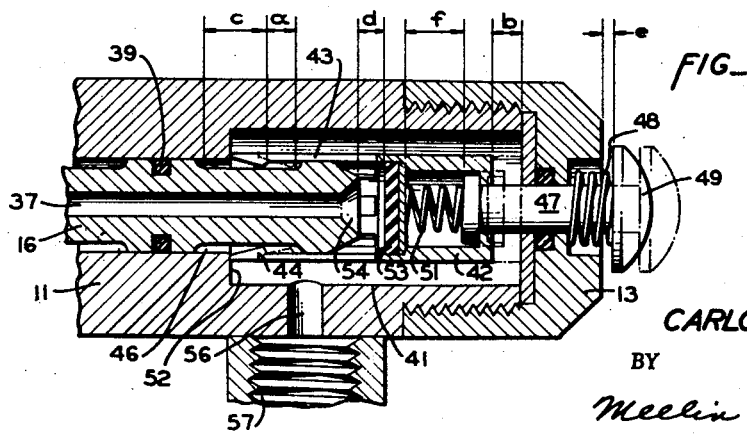
INVENTOR.
CARLOS R. CANALIZO
BY
Meelin and Hanscom
ATTORNEYS United States Patent Office 2,896,903
Patented July 28, 1959

2,896,903
CUT-OFF DEVICE

Carlos R. Canalizo, Dallas, Tex., assignor to Otis Engineering Corporation, Dallas, Tex., a corporation of Texas Application March 5, 1957, Serial No. 643,973
10 Claims. (Cl. 251—63)

This invention relates to fluid flow cut-off devices, and more particularly to a condition responsive cut-off device for interrupting fluid flow.

It is a principal object of this invention to provide a device for cutting off fluid flow which is responsive to two conditions, and in which fluid flow is interrupted only upon the presence of both conditions.

It is a further object to provide a fluid flow cut-off device having a fluid chamber, a conduit terminating in a valve seat within said chamber, a valve member disposed within said chamber, and in which said valve seat is moved from a first position to a second position upon the presence of a predetermined condition, and in which said valve member is moved from a first position to a second position upon the presence of a given condition, and in which the valve member seals against said valve seat to cut off flow therethrough only when both of said valve seat and valve member are in their second positions.

A still further object of the invention is to provide a cut-off device as set forth in the last object and in which said valve member and said valve seat are normally biased to their first positions.

Other objects and advantages will become apparent in the course of the following detailed description.

In the drawings, forming a part of the specification, and in which like reference numerals are employed to designate like parts throughout the same, Fig. 1 is a cross-sectional view through the cut-off device illustrating the relation of the parts in its normally open position.

Fig. 2 is a view similar to Fig. 1, illustrating the relation of parts when the control button is depressed.

Fig. 3 is a view similar to Fig. 1, illustrating the relation of parts when the control button is depressed and the bellows is expanded to cut off fluid flow through the device.

Fig. 4 is a perspective view of the valve holding member.

Fig. 5 is an enlarged cross-sectional view of the right-hand portion of Fig. 2.

Fig. 6 is a schematic view illustrating the use of the cut-off device of Fig. 1 in an oil well intermitting device.

In the drawings, wherein is illustrated a preferred embodiment of the invention, and referring in particular to Fig. 1, reference numeral 10 is used to generally indicate the cut-off device, which comprises a generally cylindrical housing 11 having tubular end members 12 and 13 threadedly secured at either end thereof.

A central bore 14 extends axially through the cut-off device 10 and shaft member 16 is sealingly received in said bore for longitudinal axial movement therein. The left end 17 of the bore 14 is of larger inside diameter than shaft 16 so as to form an annular passage 18 around the shaft, and a passage 19 through end member 12 connects annular passage 18 to the threaded connection 21 mounted on the exterior of the end member 12.

The bore 14 is radially enlarged intermediate its ends at 22 in order to accommodate a continuous longitudinally extensible bellows 23 in the annular space between the enlarged bore portion 22 and shaft 16. The bellows is fixed, as by welding, at its left end 24 to end member 12 and is fixed, as by welding, at its right end 26 to piston 27 integral with shaft 16. A vent hole 28 is provided at the right end of the enlarged bore portion 22.

The bore 14 is reduced in diameter at 29 to fit snugly around shaft 16, and shaft 16 has a portion thereof 31 reduced in diameter within the reduced bore portion 29 to provide an annular passage 32 therebetween. Housing member 11 has a radial passage 33 therethrough placing annular passage 32 in communication with the threaded connection 34. A radial passage 36 is formed in shaft 16 to provide communication from the annular passage 32 to the passage 37 extending axially through shaft 16. O-rings 38 and 39 provide seals at either end of the annular passage 32.

The right end of the cut-off device 10 is best illustrated with reference to Fig. 5. The housing bore 14 is radially enlarged to form chamber 41 to receive the valve cage 42 therein. This cage is provided with a plurality of longitudinally extending spring fingers 43, each having a hook portion 44 adapted to contact a reduced diameter portion 46 on the surface of shaft 16, so as to center the cage 42 on shaft 16, the reduced diameter portion 46 being sufficiently elongated so as to allow relative longitudinal movement between shaft 16 and cage 42.

The cage 42 is adapted to be moved longitudinally within chamber 41 by plunger 47 extending from the cage 42 through the end wall of end member 13. A compression spring 48 forces the button 49 on the plunger outwardly from the end member 13 so as to normally maintain the cage 42 at a rightward position. When the button is pressed to the left, the plunger 47 will exert a force through take-up spring 51 to move the cage 42 to the left until the ends of the fingers 44 are stopped by their engagement with shoulder 52 of the housing member 11.

A valve member 53 is secured to cage 42 by conventional means, so as to be carried thereby, the valve member 53 being positioned so as to come into engagement with valve seat 54 on the right end of shaft 16. A radial passage 56 through housing member 11 places the chamber 41 in fluid communication with the threaded connection 57.

With further reference to Fig. 5, the reduced diameter portion 46 of shaft 16 must be sufficiently wide so that the distance "a" is greater than the distance "b" so that the cage 42 can travel all the way to the right when the plunger button 49 is released. Furthermore, the distance "c" must be greater than the distance "d" between valve seat 54 and valve 53 so that the valve 53 will be seated on the valve seat 54 on rightward movement of shaft 16 when the plunger button 49 is depressed. The distance "e" is less than the amount of movement of the plunger 47 within the cage 42 allowed by the take-up spring 51 so that the cage 42 may be moved to the left with the fingers 43 thereof coming into stopping engagement by shoulder 52 by a partial depression of plunger button 49, with the remaining travel of the plunger 48 being taken up by the compression of spring 51.

Returning to Fig. 1, the shaft 16 is biased to a leftward position within bore 14 by compression spring 61 which surrounds the shaft 16 and is confined between the housing end member 12 and adjustment nut 62. The shaft 16 will be held in its leftward position by the force of spring 61 until a sufficient pressure is admitted through passage 19 into bellows 23 to overcome this spring force and expand the bellows to the right, moving the shaft 16 therewith. The adjustment nut 62 can vary the biasing force of spring 61 on shaft 16 so that the shaft 16 may be moved to the right whenever the pressure within the bellows 23 exceeds a predetermined amount.

Fig. 6 illustrates one use of the cut-off device, as employed in an automatic intermitting system for gas lifting production of oil wells. This intermitting system is shown in more detail in my copending application, Serial No. 678,757, filed August 12, 1957, which is a continuation-in-part application of my previously filed application, Serial No. 643,992, filed March 5, 1957, and it is thought that the schematic illustration here presented will be sufficient for the purposes of this application.

A main gas feed conduit 101 is provided, having one end thereof adapted to be connected to a source of high pressure lifting gas (not shown), and the other end thereof connected to main valve 102. Conduit 103 extends from the main valve 102 to the interior of the well casing 104. The oil from the well flows therefrom through the well tubing 105.

A branch conduit 106 takes gas from the main feed conduit 101 and passes it through a pressure reducer 107 where the pressure is reduced to a usable amount, as, for example, 25 p.s.i., the reduced pressure gas then going to the inlet 108 of the four-way valve 109. The reduced pressure also passes through inlets 111 and 112 in the top and bottom, respectively, of the four-way valve 109. In the position of the valve piston 113, as shown in Fig. 6, the gas entering the inlet 108 will flow from the outlet 114 into conduit 116, into connection 57 of the cut-off device 10, through the passages 37 and 33 thereof, out through connection 34, conduit 117, and into the middle chamber 118 of the housing 119. Flexible diaphragms 121 and 122 divide the housing 119 into an upper, middle and lower chamber 123, 118 and 124, respectively the lower chamber 124 being vented to atmosphere through orifice 126.

A second housing 127 is spaced above casing 119, and a flexible diaphragm 128 divides housing 127 into upper and lower chambers 129 and 131, respectively. The upper chamber 129 is vented to atmosphere through conduit 132, and outlet openings 133 and 134 of valve 109.

The flexible diaphragms 121 and 128 are mechanically interconnected by a rigid rod 136 having a valve actuating plate 137 and button 138 mounted intermediate thereon.

A first circulating fluid path is provided from chamber 123 upwardly through metering valve 139 and check valve 141 into chamber 131, and a second circulating path is provided from chamber 131 downwardly through check valve 142 and metering valve 143 into chamber 123, so that oil may circulate between chambers 123 and 131.

A rod 144 is connected to diaphragm 122 so as to move longitudinally therewith, the rod 144 being used to control the flow through valve 102 such that when the rod 144 is moved downwardly, flow through valve 102 will be shut off, while an upward position of rod 144 will open valve 102 to fluid flow therethrough.

A conduit 146 connects the threaded connection 21 of the cut-off device 10 to the well tubing 105 so that the cut-off device will be responsive to the pressure within the well tubing 105.

Considering now the operation of the intermitter without the cut-off effect of the cut-off device 10, high pressure gas will be supplied from the main feed conduit 101, through the pressure reducer 107 into opening 108 of valve 109, out through the opening 114 thereof, through conduit 116, the normally open cut-off device 10, and through conduit 117 to chamber 118 of housing 119. At the same time chamber 129 of the upper housing 127 will be vented to atmosphere through conduit 132, and openings 133 and 134 of valve 109.

The differential pressure in chambers 118 and 129 will cause an upward force on diaphragms 121 and 128, forcing the oil in chamber 123 to flow upwardly through the metering valve 139 and check valve 141 into chamber 131. As this occurs, the diaphragms 121 and 128 will flex upwardly, carrying with them their interconnecting shaft 136. The shaft 136 will continue to move upwardly until the valve actuating plate 137 engages the valve operator of relief valve 147, which vents the lower end of valve 109 to atmosphere. The upper end of valve 109 is unvented, and the pressure of the gas entering opening 111 will force the valve piston 113 downwardly, so that the incoming gas through opening 108 will now pass out opening 133 and through conduit 132 into chamber 129 of the upper housing 127. At the same time, chamber 118 of the lower housing 119 will be vented to atmosphere through openings 114 and 148 of valve 109. This higher pressure in chamber 129 forces the oil in chamber 131 downwardly through check valve 142 and metering valve 143 into chamber 123, and the diaphragms 128 and 121 flex downwardly in unison, carrying shaft 136 downwardly therewith. Eventually, the valve actuator plate 137 will engage the valve operator of valve 149, so that the upper end of the valve 109 will be vented to atmosphere, causing the valve piston 113 to move upwardly to the position shown in Fig. 6, so that the intermitting device will continue to cycle.

Each time that gas is admitted into chamber 118, pressure will be exerted downwardly on diaphragm 122, to cause this diaphragm to flex downwardly, carrying shaft 144 therewith to shut off the main valve 102. Whenever chamber 118 is vented to atmosphere, the pressures will equalized on either side of diaphragm 122 and the shaft 144 will be allowed to rise, and to open valve 102 to gas flow therethrough.

In the operation thus far, as long as the cut-off device 10 is normally open so as to allow flow therethrough between passages 33 and 56, the intermitting device will automatically open and close the main valve 102, the time duration of each opening and closing being regulable by the length of time the oil in chambers 123 and 131 takes in passing through the adjustable metering valves 139 and 143.

The cut-off device 10 is utilized in the above intermitting device in the following manner. The threaded connection 21 of the cut-off device is connected through conduit 146 to the well tubing 105, so that the tubing pressure is exerted on the piston 27 on shaft 16 which would tend to move it to the right. At the same time, the pressure of the gas in chamber 41 exerts a pressure on shaft 16 in opposition to the tubing pressure thereon. If it is desired to have the cut-off device operate if the tubing pressure rises above 500 p.s.i., then the adjusting nut 62 is rotated on shaft 16 to compress spring 61 so that the combined forces of the spring 61 and the low pressure gas in chamber 41 will hold shaft 16 in its leftward position against any tubing pressure up to 500 p.s.i. If the tubing pressure rises to above 500 p.s.i., the rightward force on piston 27 will be greater than the forces of the spring 61 and the gas in chamber 41, and the shaft 16 will be moved to the right.

In the normal operation of the intermitter discussed above, each time the shaft 136 moves upwardly, the button 138 carried thereby will come into engagement with the button head 49 of plunger 48, causing the case 42 and valve member 53 to move leftwardly towards the valve seat 54 formed on shaft 16 until the cage reaches the position as shown in Fig. 2. If the tubing pressure is less than 500 p.s.i., the shaft 16 will be held in its leftward position, and flow through the passage 37 will not be interrupted, so that the intermitter chamber 118 will be able to vent to atmosphere through the four-way valve 109 when the relief valve 147 is actuated.

If, in the course of operation, the tubing pressure rises above 500 p.s.i., the shaft 16 will be moved to its rightward position as shown in Fig. 3. If the plunger 48 is not depressed by button 138 at this time, the valve member 53 will be remote from valve seat 54 and passage 37 will not be shut off, and the intermitter continues its cycling operation until the shaft 136 moves upwardly, bringing the button 138 thereon into engagement with the plunger button 49. The plunger 47 will now be depressed to the position as shown in Fig. 3, and the valve member 53 will seat on valve seat 54, thus shutting off the passage 37 through the cut-off device 10, and trapping the gas in the intermitter chamber 118. The shaft 136 will move slightly further upwardly from the pressure of the gas in chamber 118, and the relief valve 147 will be operated to shift the four-way valve 109 so as to pressurize intermitter chamber 129, and to vent conduit 116, which vents chamber 41 of the cut-off device. The gas in chamber 118 is prevented from venting to atmosphere because the cut-off device passage 37 is blocked by valve member 43, and the pressures in intermitter chambers 129 and 118 will become equalized and the movement of shaft 136 will stop, with the plunger button 49 held depressed by the shaft button 138.

The chamber 41 of the cut-off device is vented to atmosphere through conduit 116, and the tubing pressure must fall to the amount whereby the force of spring 61 alone will retract shaft 16 to its normal position. When the tubing pressure does fall to this amount, valve seat 54 will be withdrawn from valve member 53, and the passage will become free so that intermitter chamber 118 vents to atmosphere, allowing the main valve 102 to open, and the shaft 136 to begin its downward stroke.

By this operation of the cut-off device, the intermitter is enabled to position itself so that as soon as the over pressure condition in the tubing ceases, the lifting gas may immediately be applied to the well casing through the main valve 102.

It is to be understood that the form of the invention, herewith shown and described, is to be taken as a preferred embodiment of the same, and that various changes in the shape, size and arrangement of parts may be resorted to without departing from the spirit of the invention, or the scope of the attached claims.

Having thus described my invention, what I claim and desire to secure by Letters Patent is:

1. A cut-off device comprising a housing having a chamber therein, a first conduit means extending from the exterior of said housing into said chamber, a second conduit means extending from the exterior of said housing into said chamber and terminating in a valve seat in said chamber, said valve seat being movable from a first to a second position within said chamber, a valve member mounted in said chamber, means to move said valve member from a first position remote from both of said valve seat positions to a second position, the construction and arrangement of said valve member and said valve seat being such that said valve member is seated on said valve seat to interrupt fluid flow therethrough only when said valve member and said valve seat are in their second positions, a spring means to bias said valve seat to its first position, and condition responsive means to move said valve seat to its second position against the bias of said spring means upon the presence of a predetermined condition.

2. A cut-off device comprising a housing having a chamber therein, a first conduit means extending from the exterior of said housing into said chamber, a second conduit means extending from the exterior of said housing into said chamber and terminating in a valve seat in said chamber, said valve seat being movable from a first to a second position within said chamber, a valve member mounted in said chamber, means to move said valve member from a first position remote from both of said valve seat positions to a second position, the construction and arrangement of said valve member and said valve seat being such that said valve member is seated on said valve seat to interrupt fluid flow therethrough only when said valve member and said valve seat are in their second positions, a spring means to bias said valve seat to its first position, means to adjust the bias of said spring means, and condition responsive means to move said valve seat to its second position against the bias of said spring means upon the presence of a predetermined condition.

3. A cut-off device comprising a housing having a chamber therein, a first conduit means extending from the exterior of said housing into said chamber, a second conduit means extending from the exterior of said housing into said chamber and terminating in a valve seat in said chamber, said valve seat being movable from a first to a second position within said chamber, a valve member mounted in said chamber, means to move said valve member from a first position remote from both of said valve seat positions to a second position, the construction and arrangement of said valve member and said valve seat being such that said valve member is seated on said valve seat to interrupt fluid flow therethrough only when said valve member and said valve seat are in their second positions, a first spring means to bias said valve member to its first position, a second spring means to bias said valve seat to its first position, means to adjust the bias of said second spring means, and condition responsive means to move said valve seat to its second position against the bias of said second spring means upon the presence of a predetermined condition.

4. A cut-off device comprising a housing having a chamber therein, a first conduit means extending from the exterior of said housing into said chamber, a second conduit means extending from the exterior of said housing into said chamber and terminating in a valve seat in said chamber, said valve seat being movable from a first to a second position within said chamber, a valve member mounted in said chamber, means to move said valve member from a first position remote from both of said valve seat positions to a second position, the construction and arrangement of said valve member and said valve seat being such that said valve member is seated on said valve seat to interrupt fluid flow therethrough only when said valve member and said valve seat are in their second positions, a first spring means to bias said valve member to its first position, a lost motion connection between valve member and said valve member moving means, a second spring means to bias said valve seat to its first position, means to adjust the bias of said second spring means, and condition responsive means to move said valve seat to its second position against the bias of said second spring means upon the presence of a predetermined condition.

5. A cut-off device comprising a housing having a chamber therein and a passage communicating said chamber with the exterior of said housing, means forming an elongated bore through said housing into said chamber, a shaft member sealingly received in said bore for longitudinal axial movement therein from a first to a second position, said shaft having a portion thereof extending into said chamber, means forming a passage communicating the exterior of said housing through said shaft member with the interior of said chamber, said passage means including a valve seat on said shaft member portion within said chamber, a valve member mounted in said chamber, means to move said valve member from a first position remote from the first and second positions of said shaft member valve seat to a second position within said chamber, the construction and arrangement of said valve member and said valve seat being such that said valve member is seated on said valve seat only when said valve seat and said valve member are in their second positions, and means to move said shaft member from its first to its second position.

6. A cut-off device comprising a housing having a chamber therein and a passage communicating said chamber with the exterior of said housing, means forming an elongated bore through said housing into said chamber, a shaft member sealingly received in said bore for longitudinal axial movement therein from a first to a second position, said shaft having a portion thereof extending into said chamber, means forming a passage communicating the exterior of said housing through said shaft member with the interior of said chamber, said passage means including a valve seat on said shaft member portion within said chamber, a valve member mounted in said chamber, means to move said valve member from a first position remote from the first and second positions of said shaft member valve seat to a second position within said chamber, the construction and arrangement of said valve member and said valve seat being such that said valve member is seated on said valve seat only when said valve seat and said valve member are in their second positions, a spring means biasing said shaft member to its first position, and pressure responsive means to force the shaft to its second position against the bias of said spring means upon the presence of a predetermined pressure.

7. A cut-off device comprising a housing having a chamber therein and a passage communicating said chamber with the exterior of said housing, means forming an elongated bore through said housing into said chamber, a shaft member sealingly received in said bore for longitudinal axial movement therein from a first to a second position, said shaft having a portion thereof extending into said chamber, means forming a passage communicating the exterior of said housing through said shaft member with the interior of said chamber, said passage means including a valve seat on said shaft member portion within said chamber, a valve member mounted in said chamber, means to move said valve member from a first position remote from the first and second positions of said shaft member valve seat to a second position within said chamber, said valve member moving means including an operating portion exterior of said housing, the construction and arrangement of said valve member and said valve seat being such that said valve member is seated on said valve seat only when said valve seat and said valve member are in their second positions, a first spring means biasing said valve member to its first position, a lost motion connection between said valve member moving means and said valve member, a second spring means biasing said shaft member to its first position, means to adjust the bias of said second spring means, and pressure responsive means to force the shaft to its second position against the bias of said second spring means upon the presence of a predetermined pressure.

8. A cut-off device comprising a housing having a chamber therein and a passage communicating said chamber with the exterior of said housing, means forming an elongated bore through said housing into said chamber, a shaft member sealingly received in said bore for longitudinal axial movement therein from a first to a second position, said shaft having a portion thereof extending into said chamber, means forming a passage communicating the exterior of said housing through said shaft member with the interior of said chamber, said passage means including a valve seat on said shaft member portion within said chamber, a valve member mounted in said chamber, means to move said valve member from a first position remote from the first and second positions of said shaft member valve seat to a second position within said chamber, the construction and arrangement of said valve member and said valve seat being such that said valve member is seated on said valve seat only when said valve seat and said valve member are in their second positions, a spring means biasing said shaft member to its first position, means forming a radially enlarged section in said elongated bore to provide an annular space around said shaft, a longitudinally extensible bellows mounted around said shaft in said annular space, said bellows being fixed at one end thereof to said shaft and at the other end thereof to said bore, and means forming a conduit through said housing to the annular space between said shaft and said bellows, whereby fluid under pressure may be introduced into said bellows to force the shaft to its second position against the bias of said spring means.

9. A cut-off device comprising a housing having a chamber therein and a passage communicating said chamber with the exterior of said housing, means forming an elongated bore through said housing into said chamber, a shaft member sealingly received in said bore for longitudinal axial movement therein from a first to a second position, said shaft having a portion thereof extending into said chamber, means forming a passage communicating the exterior of said housing through said shaft member with the interior of said chamber, said passage means including a valve seat on said shaft member portion within said chamber, a valve member mounted in said chamber, means to move said valve member from a first position remote from the first and second positions of said shaft member valve seat to a second position within said chamber, said valve member moving means including an operating portion exterior of said housing, the construction and arrangement of said valve member and said valve seat being such that said valve member is seated on said valve seat only when said valve seat and said valve member are in their second positions, a first spring means biasing said valve member to its first position, a second spring means biasing said shaft member to its first position, means forming a radially enlarged section in said elongated bore to provide an annular space around said shaft, a longitudinally extensible bellows mounted around said shaft in said annular space, said bellows being fixed at one end thereof to said shaft and at the other end thereof to said bore, and means forming a conduit through said housing to the annular space between said shaft and said bellows, whereby fluid under pressure may be introduced into said bellows to force the shaft to its second position against the bias of said second spring means.

10. A cut-off device comprising a housing having a chamber therein and a passage communicating said chamber with the exterior of said housing, means forming an elongated bore through said housing into said chamber, a shaft member sealingly received in said bore for longitudinal axial movement therein from a first to a second position, said shaft having a portion thereof extending into said chamber, means forming a passage communicating the exterior of said housing through said shaft member with the interior of said chamber, said passage means including a valve seat on said shaft member portion within said chamber, a valve member mounted in said chamber, means to move said valve member from a first position remote from the first and second positions of said shaft member valve seat to a second position within said chamber, said valve member moving means including an operating portion exterior of said housing, the construction and arrangement of said valve member and said valve seat being such that said valve member is seated on said valve seat only when said valve seat and said valve member are in their second positions, a first spring means biasing said valve member to its first position, a lost motion connection between said valve member moving means and said valve member, a second spring means biasing said shaft member to its first position, means to adjust the bias of said second spring means to a predetermined amount, means forming a radially enlarged section in said elongated bore to provide an annular space around said shaft, a longitudinally extensible bellows mounted around said shaft in said annular space, said bellows being fixed at one end thereof to said shaft and at the other end thereof to said bore, and means forming a conduit through said housing to the annular space between said shaft and said bellows, whereby fluid under pressure may be introduced into said bellows to force the shaft to its second position against the bias of said second spring means.

References Cited in the file of this patent

UNITED STATES PATENTS

| | | |
|---|---|---|
| 608,568 | Blechynder | Aug. 9, 1898 |
| 1,244,330 | Holt | Oct. 23, 1917 |
| 1,538,558 | Ileman | May 19, 1925 |
| 2,209,991 | McGill | Aug. 6, 1940 |